United States Patent [19]

Nishihara

[11] Patent Number: 5,233,412
[45] Date of Patent: Aug. 3, 1993

[54] COLOR IMAGE PROCESSING DEVICE WHICH PRODUCES A CORRECTED COLOR IMAGE SIGNAL

[75] Inventor: Masahiro Nishihara, Nagoya, Japan

[73] Assignee: Brother Kogyo Kabushiki Kaisha, Nagoya, Japan

[21] Appl. No.: 772,660

[22] Filed: Oct. 7, 1991

[30] Foreign Application Priority Data

Oct. 5, 1990 [JP] Japan ................................. 2-268817

[51] Int. Cl.$^5$ .......................... H04N 1/46; G03F 3/08
[52] U.S. Cl. ........................................ 358/75; 358/80
[58] Field of Search ................................ 358/75–80; 340/701, 703

[56] References Cited

U.S. PATENT DOCUMENTS

| | | |
|---|---|---|
| 4,668,980 | 5/1987 | Stansfield et al. ............... 358/80 |
| 4,727,434 | 2/1988 | Kawamura ....................... 358/80 |
| 4,774,567 | 9/1988 | Stansfield et al. ............... 358/80 |
| 4,866,514 | 9/1989 | Yeomans .......................... 358/80 |
| 4,910,589 | 3/1990 | Nagano et al. .................. 358/75 |
| 4,989,080 | 1/1991 | Ito .................................... 358/75 |

*Primary Examiner*—Stephen Brinich
*Attorney, Agent, or Firm*—Oliff & Berridge

[57] ABSTRACT

A processing device includes a correction table memory which stores data regarding a relationship between a predetermined number of discrete points and an equal number of corrected points. The discrete points correspond to lattice points in an RGB color lattice space. The levels of the red, green, and blue color components are assigned to the three axes of the lattice space, respectively. The corrected points are determined by producing a plurality of color charts upon successively applying m-number of first reference color image signals to a color printer, reading each of the plurality of color charts with an image scanner and outputtting m-number of second reference color image signals corresponding to the first reference color image signals, selecting n-number of the second reference color image signals from the m-number of second reference color image signals, the selected n-number of the second reference color image signals being nearer in spatial position of the color lattice point than non-selected ones of the second reference color image signals, and determining the corrected points according to specificied equation. When a color print is made, the processing device processes a color image signal representative of an original color image based on the data stored in the correction table memory.

12 Claims, 2 Drawing Sheets

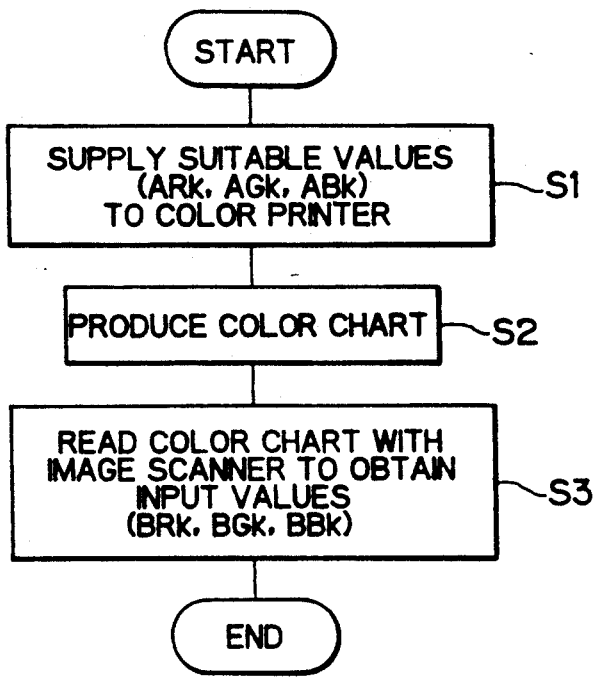
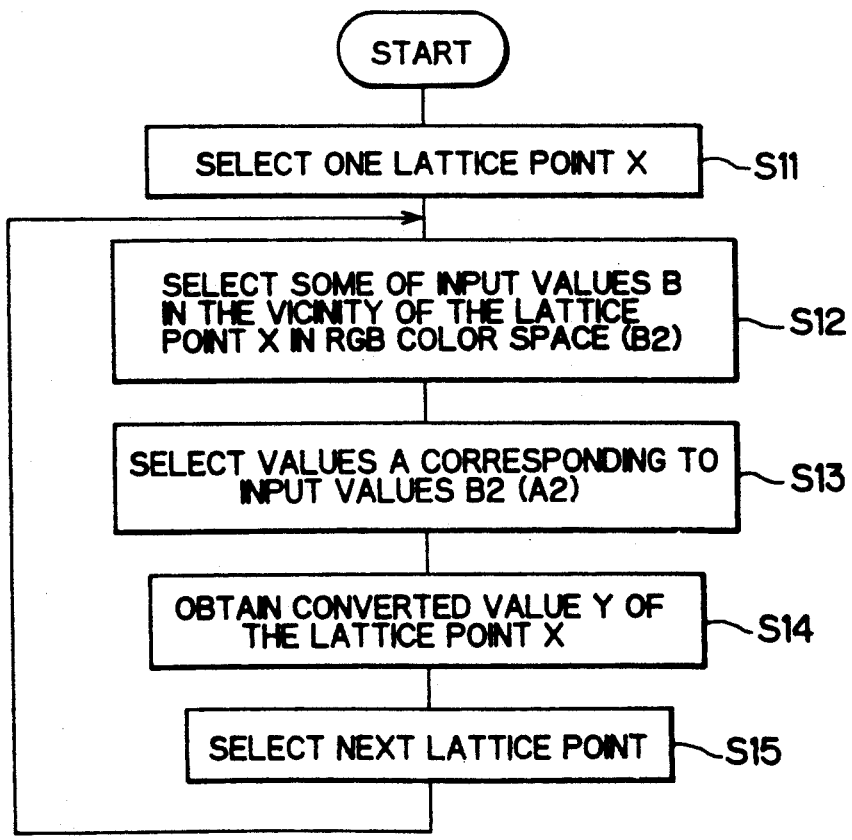

COLOR IMAGE PROCESSING DEVICE WHICH PRODUCES A CORRECTED COLOR IMAGE SIGNAL

BACKGROUND OF THE INVENTION

1. Field of the Invention

The present invention relates to a color image processing device for use in conjunction with a color copier, a color printer or the like. More particularly, the invention relates to a color image processing device for producing a corrected color image signal to be applied to a color printer upon processing an original color image signal relayed from an image scanner, thereby reproducing a color image with excellent fidelity.

2. Description of the Prior Art

Heretofore, there has been known a digital color printer which prints a color image in accordance with color data relayed from an optical image scanner which optically scans and reads a color image of an original color document. In such a color printer, a color print with excellent fidelity cannot be obtained insofar as the color data produced from the optical scanner are directly supplied to the color printer. This is due to the fact that the printer has an inherent characteristic in reproducing colors.

To improve the color fidelity of the output color print, it has been proposed to carry out a masking process of the color data prior to supplying it to the color printer. In the typical masking process, a 3-by-3 matrix is used. Representing the color data picked up by the image scanner as R, G and B, and modified color image to be supplied to the color printer as R', G' and B', the following matrix is used.

$$\begin{vmatrix} R' \\ G' \\ B' \end{vmatrix} = A \begin{vmatrix} R \\ G \\ B \end{vmatrix} \quad (1)$$

where A is a 3-by-3 matrix.

However, the color fidelity of the output color print is not yet satisfactory even if the masking process with the 3-by-3 matrix is performed. One possible solution to further improve the color fidelity is to introduce the terms of the increased order color components in the matrix. For example, for the matrix including the terms of the second order color components, the following masking process is to be executed:

$$\begin{vmatrix} R' \\ G' \\ B' \end{vmatrix} = A \begin{vmatrix} R \\ G \\ B \\ R \times R \\ G \times G \\ B \times B \\ R \times G \\ G \times B \\ B \times R \\ 1 \end{vmatrix} \quad (2)$$

where A is a 3-by-10 matrix.

With such a masking process, the color fidelity is further improved. However, no further improvement of the color fidelity cannot be achieved even if the order of the color components were further increased.

SUMMARY OF THE INVENTION

The present invention has been made to solve the aforementioned problems, and accordingly it is an object of the present invention to provide an improved color image processing apparatus which is able to reproduce a color image with excellent fidelity.

In accordance with the present invention, there is provided a color image processing device which is used in conjunction with an image reading device and a color image reproducing device. The color image processing device produces a corrected color image signal to be applied to the color image reproducing device upon processing an original color image signal representative of an original color image relayed from the image reading device. Each of the original color image signal and the corrected color image signal consists of red, green, and blue color components having respective levels.

The color image processing device of the present invention comprises storage means and processing means. The storage means contains a table which stores data regarding a relationship between a predetermined number of discrete points and an equal number of corrected points. The predetermined number of discrete points correspond to lattice points in a color lattice space defined by three axes extending in directions orthogonal to one another, wherein the levels of the red, green, and blue color components are assigned to the three axes, respectively, and the each of the lattice points is represented by a coordinate values as XR, XG, XB. Each of the corrected points is represented by the coordinate values as YR, YG, and YB.

The corrected point of the lattice points are determined in advance. Firstly, a plurality of color charts are produced upon successively applying m-number of first reference color image signals to a color image reproducing device. Each of the m-number of first reference color image signals consists of red, green, and blue components having respective levels and is represented by ARk, AGk, and ABk, respectively, where k is one of natural numbers in a range of one to m. Secondly, each of the plurality of color charts is read with an image reading device to output m-number of second reference color image signals corresponding to the first reference color image signals. Each of the second reference color image signals consists of red, green, and blue components having respective levels and is represented by BR2k, BG2k, and BB2k. Thirdly, n-number of the second reference color image signals are selected from the m-number of second reference color image signals. The selected n-number of the second reference color image signals are nearer in spatial position of the color lattice point than non-selected ones of the second reference color image signals. Fourthly, the corrected points are determined by:

$$YR = \Sigma (MRk/Lk)/W + XR$$
$$YG = \Sigma (MGk/Lk)/W + XG$$
$$YB = \Sigma (MBk/Lk)/W + XB$$

where $$MRk = AR2k - BR2k$$
$$MGk = AG2k - BG2k$$
$$MBk = AB2k - BB2k$$

$$Lk = \sqrt{(BR2k - XR)^2 + (BG2k - XG)^2 + (BB2k - XB)^2}$$

The processing means processes a color image signal representative of an original color image based on the data stored in the table of said memory means.

It is desirable that Lk is replaced by $(Lk)^n$ where n is a real number greater than one.

The corrected points may be determined by $$YR = \Sigma(AR2k/Lk)/\Sigma(1/Lk)$$

$$YG = \Sigma(AG2k/Lk)/\Sigma(1/Lk)$$

$$YB = \Sigma(AB2k/Lk)/\Sigma(1/Lk)$$

or $$YR = \Sigma(MRk/Lk)/\Sigma(1/Lk) + XR$$

$$YG = \Sigma(MGk/Lk)/\Sigma(1/Lk) + XG$$

$$YB = \Sigma(MBk/Lk)/\Sigma(1/Lk) + XB$$

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flow chart for description of a procedure for obtaining correction values to be stored in a correction table; and FIG. 5 is a flow chart for description of a procedure for obtaining conversion values corresponding to each lattice point.

DETAILED DESCRIPTION OF THE PREFERRED EMBODIMENT

A preferred embodiment of the present invention will now be described with reference to the accompanying drawings.

Figure 1:
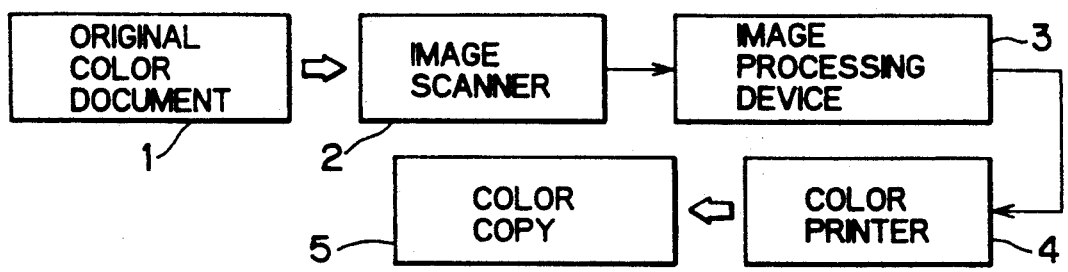
FIG. 1 is a system arrangement showing a color image processing device according to one embodiment of the present invention.

FIG. 1 shows a system arrangement of the invention. The system includes an image scanner 2, an image processing device 3, and a color printer 4. The image scanner scans a color original document 1 to optically read an image of an original color document 1. The image read by the image scanner 2 is analyzed into three color component signals consisting of red (R), green (G), and blue (B) signals which are in turn relayed to the color image processing device 3. In the image processing device 3, color correction is performed and the resulting signals are outputted to a color printer 4 which then reproduces a color image 5 corresponding to the original color image 1.

In the system shown in FIG. 1, the color image processing device 3 is provided independently of the remainder of the system. However, the device 3 may be incorporated into the interior of the color printer 4 so that the color printer 4 reproduces the color image in accordance with the data supplied from the image scanner 2 upon effecting color correction. A personal computer or the like may be used in conjunction with the color printer in lieu of the image scanner 2. The image processing device 3 may further be incorporated in the interior of a color copier which includes an image scanning section and a color image reproducing section.

The color image processing device 3 is provided with a correction table memory in which stored are conversion values which are used when the color correction is performed. Here, a three-dimensional space defined by three axes orthogonal to one another is used to illustrate the relationship between the R, G and B signals obtained from the image scanner 2 and the corresponding corrected signals. Such a three-dimensional space will hereinafter be referred to as "RGB color space". Three axes of the RGB color space represent the values of the R, G and B color signals obtained from the image scanner 2, respectively, and each of the three axes is equally divided to define lattice points. The values of the R, G and B signals from the image scanner 2 correspond to the lattice points on the three axes.

For example, if the values of the R, G and B signals obtained when the image scanner 2 reads a particular monochromatic image correspond to the lattice point K4 in the RGB color space, the conversion table provides conversion values (R=40, G=5, B=7) corresponding to the lattice point K4. The color printer reproduces a color image same as the original color image when it is supplied with such conversion values.

Figure 2:
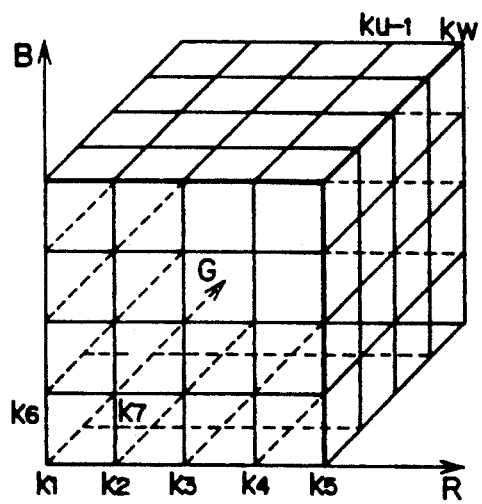
FIG. 2 is an RGB color lattice space wherein each of three axes defining the space are equally divided to define lattice points.

In the RGB color space illustrated in FIG. 2, each axis is divided into four (4). The division number, however, is not limited to this number but any other number can be adopted. The larger the division number is, the more the color fidelity is improved although the memory capacity of the correction table memory increases as the division number increases. Furthermore, while in the RGB color space of FIG. 2, the respective axes are equally divided by the same number, they may be divided unequally to one another.

Next, referring to the flow chart shown in FIG. 4, description will be made with respect to a procedure for obtaining conversion values corresponding to the color signal on a lattice point. Such conversion values are to be stored in the correction table memory in relation to the values of the color signal on the lattice points.

Firstly, appropriate values (ARk, AGk, ABk) are inputted to the color printer 4 (step 1) to produce a plurality of color charts, e.g. m-number of color charts (step 2) where k=1, 2, ..., m. It is desirable that a plurality of the color charts be produced at this stage as many as possible and the colors on the color charts be uniformly distributed over the color reproducible range of the color printer. Next, the color charts thus produced are read by the image scanner 2 one by one and the resulting data are inputted to the color printer 4 (step 3). Representing the input values applied to the color printer 4 as BRk, BGk and BBk where k=1, 2, ..., m, it can be appreciated that m-number of input values B and the corresponding output values A are obtained. Based on the values A and B, the conversion values in each lattice point will be obtained.

Referring to the flow chart shown in FIG. 5, description will be made with respect to how a conversion value Y (YR, YG, YB) corresponding to one of a plurality of lattice points, i.e., X (XR, XG, XB), is obtained. In step 11, one lattice point X is selected. In step 12, among the plurality of input values B in the RGB color space, n-number of input values B2 (BR2k, BG2k, BB2k where k=1, 2, ..., n) which are distributed in the vicinity of the lattice point X are selected. In step 13, the output values A2 (ARk2, AG2k, AB2k where k=1, 2, ..., n) corresponding to the input values B2 (BR2k, BG2k, BB2k) are selected from the output values A. Based on those values, the following computations are performed.

$$YR = \Sigma (MRk/Lk)/W + XR \quad (1)$$
$$YG = \Sigma (MGk/Lk)/W + XG \quad (2)$$
$$YB = \Sigma (MBk/Lk)/W + XB \quad (3)$$
where
$$MRk = AR2k - BR2k \quad (4)$$
$$MGk = AG2k - BG2k \quad (5)$$
$$MBk = AB2k - BB2k \quad (6)$$

$$Lk = \sqrt{(BR2k - XR)^2 + (BG2k - XG)^2 + (BB2k - XB)^2} \quad (7)$$

$$W = EXP(-Lk) \quad (8)$$

where $k=1, 2, \ldots, n$. By replacing Lk with $(Lk)^n$ (n represents a real number greater than one (1), i.e., $n>1$), a superior result is attainable. For example, in the case of $n=3$, $$Lk = [\sqrt{(BR2k - XR)^2 + (BG2k - XG)^2 + (BB2k - XB)^2}]^3 \quad (9)$$

Through the above computations, the conversion value Y with respect to the lattice point X can be obtained (step 14). The above processings are repeatedly executed with respect to the remaining lattice points (step 15). The converted values with respect to all the lattice points are stored in the correction table memory provided in the image processing device 3.

Next, description will be made with respect to the color correction performed when an original color document is actually reproduced by the color printer 4.

The image processing device 3 implements a computation to obtain a spatial position in the RGB color space corresponding to the color signal data relayed from the image scanner 2 and to identify the rectangular parallelepiped defined by the lattice points to which the spatial position belongs. The converted data on the vertex or the lattice point of the rectangular parallelepiped is read out of the correction table memory. Provided that each of the three axes of the RGB color space is equally divided by the same division number, the rectangular parallelepiped is in the form of a regular hexahedron.

Figure 3:
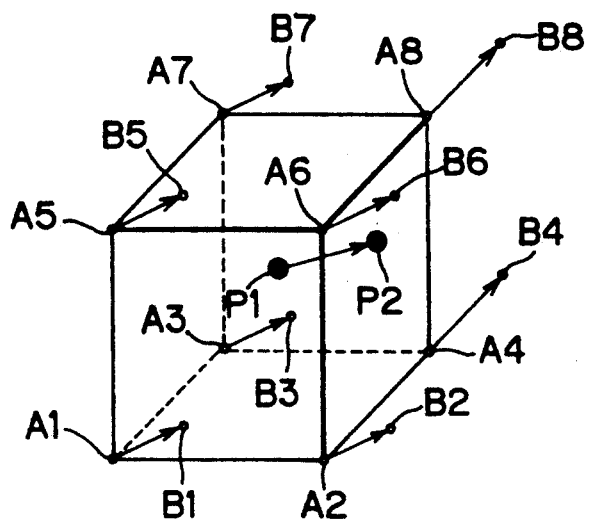
FIG. 3 is an explanatory diagram for description of color conversion at each lattice point.

FIG. 3 is an explanatory diagram for description of the conversion values of the color signals in the lattice points. A1 through A8 denote the lattice points and B1 through B8 denote the points shifted from the lattice points upon effecting conversion based on the contents in the correction table memory. The point P1 is a spatial position corresponding to the image data fed from the image scanner 2, and the point P2 is the converted point of P1. The coordinate values of the point P2 give the color corrected values and are obtained through the interpolation process. The color corrected values can be represented by a vector.

The interpolation process is implemented by multiplying a weigh factor WN to each of B1 through B8 and adding the weighted values of B1 through B8. The interpolation process is carried out independently with respect to each of the R, G and B signals.

$$P2X = \Sigma WN \times BNX \quad (10)$$

where $N=1, \ldots, 8$ and $X=R, G, B$.

Assuming that the distances from the point P1 to each of the lattice points A1 through A8 are L1 through L8, respectively, the weight factor WN is given by:

$$WN = S \times (\Sigma Lk)/LN \quad (11)$$

where $k=1, \ldots, 8$, $N=1, \ldots, 8$, and S is given by:

$$S = 1/\Sigma\{\Sigma(LK/LN)\} \quad (12)$$

where $k=1, \ldots, 8$ and $N=1, \ldots, 8$).

The following weight factor WN may be used. With respect to the point P1, the point P1 confining minimum regular hexahedron is divided into eight blocks in the form of rectangular parallelepiped. Representing the volumes of the eight blocks of the rectangular parallelepiped as V1 through V8, the following relationship is established. Note that the numeral assigned to V corresponds to the numeral assigned to the point A which is located in the diagonal position of the point P1 in each rectangular parallelepiped block. For example, the volume of the rectangular parallelepiped block in which A1 is in the diagonal position of P1 is represented by V1.

$$WN = V9 - N/SV \quad (13)$$

where $N=1, \ldots, 8$ and S is represented by:

$$SV = \Sigma VM (M=1, \ldots, 8) \quad (14)$$

The coordinate values on the point P2 obtained through the above procedure are the color corrected values of the coordinate data on the point P1. By outputting the resultant data to the color printer 4, a color image corresponding to the original is reproduced with excellent fidelity.

The color image containing a black image can be similarly dealt with by defining the color space as four-dimensional.

Further, the following equations can be used in lieu of equations (1) through (9) to obtain the conversion values on the lattice points to be stored in the correction table memory. The conversion values Y (YR, YG, YB) are represented by:

$$YR = \Sigma (AR2k/Lk)/\Sigma (1/Lk) \quad (15)$$
$$YG = \Sigma (AG2k/Lk)/\Sigma (1/Lk) \quad (16)$$
$$YB = \Sigma (AB2k/Lk)/\Sigma (1/Lk) \quad (17)$$

$$Lk = \sqrt{(BR2k - XR)^2 + (BG2k - XG)^2 + (BB2k - XB)^2} \quad (18)$$

where $k=1, 2, \ldots, n$.
Alternatively, $$YR = \Sigma (MRk/Lk)/\Sigma (1/Lk) + XR \quad (19)$$
$$YG = \Sigma (MGk/Lk)/\Sigma (1/Lk) + XG \quad (20)$$
$$YB = \Sigma (MBk/Lk)/\Sigma (1/Lk) + XB \quad (21)$$
where
$$MRK = AR2k - BR2k$$
$$MGk = AG2k - BG2k$$
$$MBk = AB2k - BB2k$$

$$Lk = \sqrt{(BR2k - XR)^2 + (BG2k - XG)^2 + (BB2k - XB)^2} \quad (22)$$

where $k=1, 2, \ldots, n$.

As described, according to the present invention, the color corrected data are stored in advance in the correction table memory in relation to original color data, and the color image data obtained from the image scanner is subjected to interpolation based on the data stored in the correction table memory. Therefore, an amount of computation is reduced in comparison with the conventional masking method. Moreover, a color reproduction with excellent fidelity can be accomplished with high accuracy and with short processing period of time involved.

What is claimed is:

1. A color image processing device for use in conjunction with an image reading device and a color image reproducing device, for producing a corrected color image signal to be applied to the color image reproducing device upon processing an original color image signal representative of an original color image relayed from the image reading device, each of the original color image signal and the corrected color image signal consisting of red, green, and blue color components having respective levels, comprising:

storage means containing a table storing data regarding a relationship between a predetermined number of discrete points and an equal number of corrected points, wherein the predetermined number of discrete points correspond to lattice points in a color lattice space defined by three axes extending in directions orthogonal to one another, the levels of the red, green, and blue color components being assigned to the three axes, respectively, each of the lattice points being represented by coordinate values as XR, XG, XB, and each of the corrected points being represented by coordinate values as YR, YG, and YB, and wherein the equal number of corrected points are determined by the steps of:

(a) producing a plurality of color charts upon successively applying m-number of first reference color image signals to a color image reproducing device, each of the m-number of first reference color image signals consisting of red, green, and blue components having respective levels and represented by $ARk$, $AGk$, and $ABk$, respectively, where k is one of a plurality of natural numbers in a range of one to m;

(b) reading each of the plurality of color charts with an image reading device and outputting m-number of second reference color image signals corresponding to the first reference color image signals, each of the second reference color image signals consisting of red, green, and blue components having respective levels and represented by $BR2k$, $BG2k$, and $BB2k$;

(c) selecting n-number of the second reference color image signals from the m-number of second reference color image signals, the selected n-number of the second reference color image signals being nearer in spatial position to the lattice point that non-selected ones of the second reference color image signals; and (d) determining the corrected points by:

$YR = \Sigma (MRk/Lk)/W + XR$
$YG = \Sigma (MGk/Lk)/W + XG$
$YB = \Sigma (MBk/Lk)/W + XB$
where
$MRk = AR2k - BR2k$
$MGk = AG2k - BG2k$ -continued
$MBk = AB2k - BB2k$ $Lk = \sqrt{(BR2k - XR)^2 + (BG2k - XG)^2 + (BB2k - XB)^2}$ and processing means for processing a color image signal representative of an original color image based on the data stored in the table of said memory means.

2. The color image processing device according to claim 1, wherein Lk is replaced by $(Lk)^n$ where n is a real number greater than one.

3. The color image processing device according to claim 1, wherein the corrected points are determined by $YR = \Sigma(AR2k/Lk)/\Sigma(1/Lk)$ $YG = \Sigma(AG2k/Lk)/\Sigma(1/Lk)$ $YB = \Sigma(AB2k/Lk)/\Sigma(1/Lk)$ instead of $YR = \Sigma(MRk/Lk)/W + XR$ $YG = \Sigma(MGk/Lk)/W + XG$ $YB = \Sigma(MBk/Lk)/W + XB.$ 4. The color image processing device according to claim 1, wherein the corrected points are determined by $YR = \Sigma(MRk/Lk)/\Sigma(1/Lk) + XR)$ $YG = \Sigma(MGk/Lk)/\Sigma(1/Lk) + XG$ $YB = \Sigma(MBk/Lk)/\Sigma(1/Lk) + XB$ instead of $YR = \Sigma(MRk/Lk)/W + XR$ $YG = \Sigma(MGk/Lk)/W + XG$ $YB = \Sigma(MBk/Lk)/W + XB.$ 5. A color printer for use in conjunction with an image reading device, comprising:

color image reproducing means for reproducing a color image;

storage means containing a table storing data regarding a relationship between a predetermined number of discrete points and an equal number of corrected points, wherein the predetermined number of discrete points correspond to lattice points in a color lattice space defined by three axes extending in directions orthogonal to one another, the levels of red, green, and blue color components being assigned to the three axes, respectively, each of the lattice points being represented by coordinate values as XR, XG, XB, and each of the corrected points being represented by coordinate values as YR, YG, and YB, and wherein the equal number of corrected points are determined by the steps of:

(a) producing a plurality of color charts upon successively applying m-number of first reference color image signals to said color image reproducing means, each of the m-number of first reference color image signals consisting of red, green, and blue components having respective levels and represented by ARk, AGk, and ABk, respectively, where k is one of a plurality of natural numbers in a range of one to m;

(b) reading each of the plurality of color charts with an image reading device and outputting m-number of second reference color image signals corresponding to the first reference color image signals, each of the second reference color image signals consisting of red, green, and blue components having respective levels and represented by BR2k, BG2k, and BB2k;

(c) selecting n-number of the second reference color image signals from the m-number of second reference color image signals, the selected n-number of the second reference color image signals being nearer in spatial position to the lattice point than non-selected ones of the second reference color image signals; and (d) determining the corrected points by:

$$YR = \Sigma (MRk/Lk)/W + XR$$
$$YG = \Sigma (MGk/Lk)/W + XG$$
$$YB = \Sigma (MBk/Lk)/W + XB$$
where
$$MRk = AR2k - BR2k$$
$$MGk = AG2k - BG2k$$
$$MBk = AB2k - BB2k$$

$$Lk = \sqrt{(BR2k - XR)^2 + (BG2k - XG)^2 + (BB2k - XB)^2}$$

and processing means for processing a color image signal representative of an original color image based on the data stored in the table of said memory means and producing a corrected color image signal used for applying to said color image reproducing means.

6. The color printer according to claim 5, wherein Lk is replaced by $(Lk)^n$ where n is a real number greater than one.

7. The color printer according to claim 5, wherein the corrected points are determined by $$YR = \Sigma(AR2k/Lk)/\Sigma(1/Lk)$$
$$YG = \Sigma(AG2k/Lk)/\Sigma(1/Lk)$$
$$YB = \Sigma(AB2k/Lk)/\Sigma(1/Lk)$$

instead of $$YR = \Sigma(MRk/Lk)/W + XR$$
$$YG = \Sigma(MGk/Lk)/W + XG$$
$$YB = \Sigma(MBk/Lk)/W + XB.$$

8. The color image processing device according to claim 5, wherein the corrected points are determined by $$YR = \Sigma(MRk/Lk)/\Sigma(1/Lk) + XR)$$
$$YG = \Sigma(MGk/Lk)/\Sigma(1/Lk) + XG$$
$$YB = \Sigma(MBk/Lk)/\Sigma(1/Lk) + XB$$

instead of $$YR = \Sigma(MRk/Lk)/W + XR$$
$$YG = \Sigma(MGk/Lk)/W + XG$$
$$YB = \Sigma(MBk/Lk)/W + XB.$$

9. A color copier comprising:

image reading means for reading a color image and outputting a color image signal;

color image reproducing means for reproducing a color image;

storage means containing a table storing data regarding a relationship between a predetermined number of discrete points and an equal number of corrected points, wherein the predetermined number of discrete points correspond to lattice points in a color lattice space defined by three axes extending in directions orthogonal to one another, the levels of red, green, and blue color components being assigned to the three axes, respectively, each of the lattice points being represented by coordinate values as XR, XG, XB, and each of the corrected points being represented by coordinate values as YR, YG, and YB, and wherein the equal number of corrected points are determined by the steps of:

(a) producing a plurality of color charts upon successively applying m-number of first reference color image signals to said color image reproducing means, each of the m-number of first reference color image signals consisting of red, green, and blue components having respective levels and represented by ARk, AGk, and ABk, respectively, where k is one of a plurality of natural numbers in a range of one to m;

(b) reading each of the plurality of color charts with said image reading means and outputting m-number of second reference color image signals corresponding to the first reference color image signals, each of the second reference color image signals consisting of red, green, and blue components having respective levels and represented by BR2k, BG2k, and BB2k;

(c) selecting n-number of the second reference color image signals from the m-number of second reference color image signals, the selected n-number of the second reference color image signals being nearer in spatial position to the lattice point than non-selected ones of the second reference color image signals; and (d) determining the corrected points by:

$$YR = \Sigma (MRk/Lk)/W + XR$$
$$YG = \Sigma (MGk/Lk)/W + XG$$
$$YB = \Sigma (MBk/Lk)/W + XB$$
where
$$MRk = AR2k - BR2k$$
$$MGk = AG2k - BG2k$$
$$MBk = AB2k - BB2k$$

$$Lk = \sqrt{(BR2k - XR)^2 + (BG2k - XG)^2 + (BB2k - XB)^2}$$

and processing means for processing a color image signal representative of an original color image based on the data stored in the table of said memory means and producing a corrected color image signal used for applying to said color image reproducing means.

10. The color copier according to claim 9, wherein Lk is replaced by $(Lk)^n$ where n is a real number greater than one.

11. The color copier according to claim 9, wherein the corrected points are determined by $$YR = \Sigma(AR2k/Lk)/\Sigma(1/Lk)$$

$$YG = \Sigma(AG2k/Lk)/\Sigma(1/Lk)$$

$$YB = \Sigma(AB2k/Lk)/\Sigma(1/Lk)$$

instead of $$YR = \Sigma(MRk/Lk)/W + XR$$

$$YG = \Sigma(MGk/Lk)/W + XG$$

$$YB = \Sigma(MBk/Lk)/W + XB.$$

12. The color copier according to claim 9, wherein the corrected points are determined by $$YR = \Sigma(MRk/Lk)/\Sigma(1/Lk) + XR)$$

$$YG = \Sigma(MGk/Lk)/\Sigma(1/Lk) + XG$$

$$YB = \Sigma(MBk/Lk)/\Sigma(1/Lk) + XB$$

instead of $$YR = \Sigma(MRk/Lk)/W + XR$$

$$YG = \Sigma(MGk/Lk)/W + XG$$

$$YB = \Sigma(MBk/Lk)/W + XB.$$

* * * * *